United States Patent [19]
Macris et al.

[11] Patent Number: 5,910,369
[45] Date of Patent: Jun. 8, 1999

[54] METHODS FOR PROTECTING SUBSTRATES WITH URETHANE PROTECTIVE COATINGS

[75] Inventors: Michael N. Macris, Sandy; David Dobney, Salt Lake City, both of Utah

[73] Assignee: American Polymer, Inc., Sandy, Utah

[21] Appl. No.: 08/475,591

[22] Filed: Jun. 7, 1995

Related U.S. Application Data

[62] Division of application No. 08/403,583, Mar. 14, 1995, abandoned, which is a continuation of application No. 08/056,250, Apr. 30, 1993, abandoned, which is a continuation-in-part of application No. 07/877,840, May 1, 1992, abandoned.

[51] Int. Cl.$^6$ .............................. B32B 27/00; C08K 3/20
[52] U.S. Cl. .................................. 428/423.1; 428/424.2; 523/404; 523/415; 523/443; 525/453; 525/460
[58] Field of Search .................................. 523/404, 415, 523/443; 525/453, 460; 528/60, 65; 428/423.1, 424.2

[56] References Cited

U.S. PATENT DOCUMENTS

| | | | |
|---|---|---|---|
| 3,676,455 | 7/1972 | Haug et al. | 260/309.5 |
| 3,839,066 | 10/1974 | Brenner | 117/6 |
| 4,141,755 | 2/1979 | Weiss et al. | 134/42 |
| 4,169,088 | 9/1979 | Hansen | 260/29.6 |
| 4,177,099 | 12/1979 | Radzwill | 156/99 |
| 4,199,620 | 4/1980 | Edwards et al. | 427/156 |
| 4,241,141 | 12/1980 | Dill | 428/500 |
| 4,322,508 | 3/1982 | Peng et al. | 525/110 |
| 4,337,299 | 6/1982 | van den Bergh | 428/562 |
| 4,349,586 | 9/1982 | Sejournant | 427/154 |
| 4,353,745 | 10/1982 | Ebbeler | 106/2 |
| 4,412,033 | 10/1983 | LaBelle et al. | 524/590 |
| 4,428,994 | 1/1984 | Rawlins | 428/164 |
| 4,463,038 | 7/1984 | Takeuchi et al. | 427/407 |
| 4,499,149 | 2/1985 | Berger | 428/447 |
| 4,590,097 | 5/1986 | Booth et al. | 427/154 |
| 4,600,522 | 7/1986 | Grzeskowiak, Jr. et al. | 252/170 |
| 4,716,056 | 12/1987 | Fox et al. | 427/407 |
| 4,758,622 | 7/1988 | Gosselin | 524/716 |
| 4,777,090 | 10/1988 | Ovshinsky et al. | 428/408 |
| 4,859,791 | 8/1989 | Nodelman et al. | 560/91 |
| 4,943,680 | 7/1990 | Ellison et al. | 427/154 |
| 5,017,237 | 5/1991 | Svensson | 134/4 |
| 5,024,780 | 6/1991 | Leys | 252/162 |
| 5,039,745 | 8/1991 | Riddle | 525/101 |
| 5,049,314 | 9/1991 | Short | 252/542 |
| 5,061,518 | 10/1991 | Langerbeins et al. | 427/154 |
| 5,084,370 | 1/1992 | Bell et al. | 430/270 |
| 5,330,788 | 7/1994 | Roberts | 427/154 |
| 5,352,733 | 10/1994 | Hart | 524/840 |
| 5,387,434 | 2/1995 | Black | 427/154 |
| 5,418,006 | 5/1995 | Roth et al. | 427/154 |
| 5,496,642 | 3/1996 | Martinez et al. | 428/423.1 |
| 5,631,042 | 5/1997 | Becker et al. | 427/154 |

FOREIGN PATENT DOCUMENTS

| | | |
|---|---|---|
| A-74012/87 | 12/1987 | Australia . |
| 2191501 | 12/1987 | United Kingdom . |
| WO 88/08445 | 11/1988 | WIPO . |

OTHER PUBLICATIONS

Degussa Corporation Pigment Group, *Fumed Silicas, Precipitated Silicas, Flatting Agents, Organosilanes and Carbon Blacks* (no publication date available).
Ferch, et al. *Technical Bulletin Pigments: Degussa Flatting Agents for the Coating Industry*, Department of Applied Research and Technical Services, Silicas and Pigments, Degussa AG, 1–45 (3rd Ed., Dec. 1989).
*Hawley's Condensed Chemical Dictionary*, 526 (Richard J. Lewis, Sr., ed., 12th Ed., 1993).
Product Index, "Raw Materials For High–Performance Coatings", Miles Industrial Chemical Division (1993).
*Desmophen 650 A—65 PMA, Material Safety Data Sheet* as provided by the Miles/Mobay Corp, (Oct. 3, 1990).
Hahn, Roger, *Paint Forecast*, The Construction Specifier, 25–26 (Oct. 1991).
*Modaflow Resin Modifier Material Safety Data* as provided by Monsanto Company, (Jan. 23, 1991).
*Monochem Perma Shield–Graffiti Resistant Coating Technical Bulletin* as provided by Monopole Int'l, Inc. (no publication date available).
*Monochem 9500 Super Graffiti Remover Product Information* as provided by Monopole Int'l, Inc. (no publication date available).
*Product Data on Fast Acting Graffiti Remover/Defacer Eraser* as provided by ProSoCo, Inc. (1991).
*Product Data on Graffiti Control A & B/Defacer Eraser* as provided by ProSoCo, Inc. (1991).
*Product Data on Graffiti Stop A & B/Defacer Eraser* as provided by ProSoCo, Inc. (1991).
*Tex Cote Technical Data* as provided by Textured Coatings of America (no publication date available).
Grimm, Clayford T., *Clear Consequences*, The Construction Specifier, 143, 146, 149–152 (May 1993).

*Primary Examiner*—Randy Gulakowski
*Attorney, Agent, or Firm*—Workman Nydegger Seeley

[57] ABSTRACT

A system for protecting surfaces and facilitating the removal of unwanted substances therefrom is disclosed, the system including a polymeric coating having a low volatile organics content (VOC) which is safe for the environment, and a cleaner for application to the coating to remove material from the coating, such as graffiti. The coating may be either a water-based epoxy comprising a bisphenol A resin and polyamide resin, or an aliphatic urethane comprising a polymer having reactive sites which react with a isocyanate and an aliphatic isocyanate. The cleaner is suitable for removing all manner of epoxy and urethane based spray paints, indelible inks, industrial chemicals, and the like. The cleaner comprises N-methyl pyrrolidone in a concentration of fifty percent by weight or greater and a surfactant.

19 Claims, No Drawings

METHODS FOR PROTECTING SUBSTRATES WITH URETHANE PROTECTIVE COATINGS

RELATED APPLICATIONS

This application is a divisional of U.S. patent application Ser. No. 08/403,583, entitled "SURFACE PRE-TREATMENT FOR THE REMOVAL OF GRAFFITI THEREFROM," filed Mar. 14, 1995, the names of Michael N. Macris and David Dobney now abandoned. U.S. patent application Ser. No. 08/403,583 is a continuation of Ser. No. 08/056,250 entitled "SURFACE PRE-TREATMENT FOR THE REMOVAL OF GRAFFITI THEREFROM," filed Apr. 30, 1993, in the names of Michael N. Macris and David Dobney now abandoned. U.S. patent application Ser. No. 08/056,250 is a continuation-in-part of U.S. patent application Ser. No. 07/877,840, entitled "SURFACE PRE-TREATMENT FOR THE REMOVAL OF GRAFFITI THEREFROM," filed May 1, 1992, in the names of Michael N. Macris and David Dobney now abandoned.

TECHNICAL FIELD

This invention relates to means for facilitating removal of unwanted substances, such as graffiti, from walls or similar surfaces. Specifically, this invention relates to the pre-treatment of surfaces with environmentally safe coatings which allow removal of contaminants and graffiti from the surface without degradation of the underlying coating.

BACKGROUND

The application of graffiti to walls, vehicles and other surfaces has been a concern to society and individuals for decades. Graffiti is not only unsightly, but destructive, and leads to the expenditure of millions of dollars each year to obliterate or remove the graffiti and to restore the underlying surface. In some cities, for example, graffiti is such a pervasive problem that special booths are constructed through which municipal buses are driven to clean and restore the paint on the body of the vehicle.

Traditionally, graffiti has been removed by sandblasting the painted surface, but sandblasting obviously damages the surface over time and reduces its longevity Graffiti has also been removed by simply repainting or recoating the graffit-ied surface. Repainting or recoating, however, is time-consuming and expensive. Therefore, a variety of systems have been developed for preventing, removing or obliterat-ing graffiti. Examples of such systems are disclosed in U.S. Pat. No. 5,039,745 to Riddle, issued Aug. 13, 1991 (system providing a non-stick surface); U.S. Pat. No. 4,478,975 to Dessaint, issued Oct. 23, 1984 (disclosing a fluorinated copolymer for water- and oil-proofing surfaces); U.S. Pat. No. 4,716,056 to Fox, et al., issued Dec. 29, 1987 (disclosing a pre-reacted water-based epoxy color coating for obliterat-ing graffiti); U.S. Pat. No. 5,024,780 to Leys, issued Jun. 18, 1991 (disclosing a substance for removing graffiti as well as paint and other coatings); U.S. Pat. No. 5,017,237 to Svensson, issued May 21, 1991 (disclosing a polysaccharide coating which hardens on a surface and which is thereafter removed when soiled); U.S. Pat. No. 4,353,745 to Ebbeler, issued Oct. 12, 1982 (disclosing a clear protective coating for a surface which is thereafter removed when soiled); and U.S. Pat. No. 4,600,522 to Grzeskowiak, et ale, issued Jul. 15, 1986 (disclosing a biodegradable cleaner for removing graffiti from anodized aluminum, stainless steel and glass).

One of the most commonly used graffiti removal systems at present comprises coating a surface with a substance which is thereafter removed when soiled by graffiti or other material. Such systems are commonly referred to as "sacri-ficial coatings" since the coating is removed after soiling and must be replaced to provide further protection from graffiti and other contaminants.

Other graffiti removal systems provide obliterative coat-ings for covering graffiti already applied to a surface. A system of that type is described in U.S. Pat. No. 4,716,056 (referenced previously) in which a colored water-based epoxy coating is applied over a graffitied surface followed by an aliphatic urethane top coating. Because both the water-based epoxy and urethane coatings described therein are pre-reacted (i.e., cross-linked prior to mixing or application) and are able to be applied only after addition of a solvent and a hardener, the coatings are susceptible to degradation from application of solvent during cleaning. That is, integrity of the polymers is compromised upon subsequent application of solvent.

A number of polymer coatings presently on the market which purport to be formulated for the easy removal of graffiti therefrom are cured by solvent evaporation. While such coatings have some advantages over older formulations, they are susceptible to degradation from the solvents in spray paints used for making graffiti. That is, the solvents in spray paints weaken the polymeric integrity of the coating and a portion of the spray paint becomes imbedded in the coating as it cures. This is particularly prevalent when the graffiti is not removed within thirty-six hours after application. When cleaned, a residual amount of graffiti remains on the coating.

Solvent evaporation-cured coatings, as well as chemically cross-linked polymeric coatings currently on the market may be sufficiently cleanable to remove an acceptable amount of graffiti therefrom, but repeated cleanings tend to weaken the polymeric bonds of these coatings so that the coating becomes ineffective or permanently stained after a relatively few number of cleanings.

Additionally, many graffiti systems require removal of graffiti from the coating surface with volatile chemical substances which are potentially harmful to the user and particularly harmful to the environment. Even with sacrifi-cial coatings, the protective coating and the chemicals used to remove the coating are potentially unsafe for the envi-ronment.

Therefore, it would be advantageous to provide a graffiti removal system comprising a non-sacrificed polymeric pro-tective coating which is not susceptible to degradation when solvents and cleaners are applied, and which has a low volatile organics content thereby rendering the coating safe for the environment and users, and a non-toxic, biodegrad-able cleaner for removing graffiti from the protective coating which does not affect or degrade the coating.

DISCLOSURE OF THE INVENTION

In accordance with the present invention, a graffiti-removal system is provided which includes a protective coating for application to an underlying surface, the coating being either a water-based epoxy or an aliphatic urethane material having a low volatile organics content, and a non-toxic, biodegradable cleaner. The coatings of the present invention provide a strong and impenetrable surface which is neither degraded nor compromised by the applica-tion of solvents or cleaners and which is particularly unaf-fected by application of the biodegradable cleaner of the inventions. That is, the cleaner, when applied to the coating, will not compromise the integrity of the protective coating, but will effectively remove graffiti therefrom. The protective coatings of the invention are suitable for application to many surfaces for the easy removal of unwanted contaminants therefrom, such as industrial byproducts and wastes. However, this disclosure focusses on removal of graffiti as an exemplar.

The protective coating of the invention is applicable to a variety of surfaces, including but not limited to stone, masonry, brick, wood and metal, which have been properly prepared. The protective coating is generally a nonprereacted polymer material which cures by chemical cross-linking producing a high bond density. The coating bonds effectively to any surface.

After being contaminated by graffiti, or some other unwanted substance, the protective coating is contacted with cleaner to remove the graffiti. The protective coating is neither affected by the cleaner nor by the contaminants placed thereon, such as solvent-based paints. The coating is particularly formulated to be unaffected by prolonged application (longer than fifteen minutes) of one hundred percent concentrated N-methyl pyrrolidone. All other known coatings will degrade (i.e. soften and become permeable to entry of the unwanted substances, loss of adhesion, blistering, etc.) after a few minutes of being contacted with such a high concentration of N-methyl pyrrolidone. The protective coating may be cleaned continuously (more than one hundred times) without any need for reapplication of the coating. The protective coating of the present invention also has excellent weatherability and is resistant to chalking, flaking and yellowing (i.e., no chalking, flaking or yellowing is observed after the coating has been subjected to environmental forces for over three months).

The protective coating may be a water-based epoxy which is water soluble and has a low volatile organics content (about 0.05 to about 2.0 pounds per gallon [about 0.059 kg to about 0.24 kg per liter]). The water-based epoxy coating generally comprises a two component system which provides mixture of the polymeric components to initiate cross-linking of the polymers. Cross-linking of the mixture after being applied to the surface assures integrity of the coating against subsequent application of solvents. An epoxy resin, a polyamide resin, an ether diluent, water, a flow agent and a coalescing agent are included in the formulation. The water-based epoxy may be used in a clear state, or color additives may be mixed therewith. Typically, because epoxies produce a slight yellowish hue in the clear state, color additives are most desirably used with the water-based epoxy coating.

The water-based epoxy coating is easily applied, provides easy clean-up, has very little odor and dries to a hard, porcelain-like finish. The coating is very durable and is resistant to staining or damage by abrasion. The coating is very easily cleaned. The water-based epoxy coating may be formulated with a gloss, semi-gloss or flat finish.

Another type of protective coating which may be used in the present invention is a nonpre-reacted aliphatic urethane generally comprising a polymer having a reactive site which reacts with an isocyanate, an isocyanate, a hydrocarbon-based solvent or mixture of solvents and flow agents. Like the water-based epoxy coating, the aliphatic urethane is formed from two components which, when mixed, initiate cross-linking of the polymers. The polymers selected for use in the coating have a greater content of reactive groups per unit weight thereby producing a high density of cross-linkages, and the coating is therefore particularly resistant to subsequent application of solvents.

The urethane coating has the advantage over water-based epoxy of being usable in a clear state. That is, urethanes are not subject to a yellowing tint, so the aliphatic urethane coating may be used in the clear state. The urethane coating may also be supplemented with pigments, and may be formulated with either a gloss, semi-gloss or flat finish.

The aliphatic urethane coating inherently has a higher volatile organics content (VOC) than the water-based epoxy Nonetheless, the VOC of the aliphatic urethane coating is still comparatively small, ranging from about 2.0 to about 3.0 pounds per gallon (0.24 kg to 0.36 kg per liter). However, because some states or regions have particularly stringent requirements regarding the VOC of products used in the environment, the urethane coating may not be suitable for application in those areas.

The urethane coating provides a fast-drying, tough and durable finish to all manner and form of surfaces, including wood, metal, drywall, plaster, masonry and the like. The applied coating is stain resistant, easy to clean and is abrasion resistant. Both coatings may be applied to previously untreated surfaces or pre-treated surfaces, such as painted surfaces. The surfaces should be properly prepared prior to application of the coating. Any conventional means of application, such as brushing, spraying, or rolling, may be used to apply the coatings to a surface.

It is generally desirable to apply the coatings with a suitable thickness of material to assure coverage of previously treated surfaces, such as painted walls, and to assure a comprehensive protective coating. Under many conditions, a single application of the coating of the invention is sufficient. Subsequent coats may be applied as necessary. It is possible, though not required, to make an application of one type of coating, either the water-based epoxy or the urethane, followed by an application of the other type of coating. Because the urethane coating may slightly alter the color of some surfaces (i.e., it produces a "wet look") it may be desirable to initially apply a barrier/sealant.

The coatings of the present invention, once applied, may be cleaned with a number of different materials. Water may be used to flush the soiled coating where appropriate. Any number of commercially available cleaners, such as acetone, xylene and other industrial solvents, may also be used on the coatings without damaging the coatings.

Additionally, a biodegradable cleaner is disclosed which is non-toxic and safe for use near water sources. The water soluble cleaner dissolves all types of epoxy and urethane paints and indelible marking inks. The cleaner is formulated to act upon the protective coating to remove contaminants therefrom while not compromising the integrity of the protective coating. The cleaner generally comprises N-methyl pyrrolidone in a concentration greater than fifty percent by weight and a surfactant.

Immediately following application of the biodegradable cleaner to the protective coating, the graffiti material begins to bead and lift away from the protective coating. The graffiti and cleaner may then be wiped off with a cloth or, preferably, may be washed away with a pressurized water spray, such as a squirt bottle The biodegradable cleaner may be used to clean surfaces not coated with the protective coatings of the present invention.

The combination of pre-packaged coating components and cleaner provides a convenient means for the user to mix the two components and apply the mixture to a surface to produce an impenetrable protective coating, and to easily clean the protective coating after graffiti or other unwanted substances have been placed on the cured coating.

BEST MODE OF THE INVENTION

The graffiti-removal system of the present invention includes a protective coating for application to a surface and a biodegradable cleaner, as described further hereinafter.

Protective Coating

Water-based Epoxy

The water-based epoxy protective coating material is formed from two separate chemical mixtures, one component being a base and the second component being a reactant. The coating is formed of two separate components in order to provide non-reacted materials since pre-reacted coatings tend to result in lessened strength or integrity of the coating once applied to the surface. The base component includes a bisphenol A epoxy resin having an equivalent weight of from about 100 to about 500. As used herein, molecular weight refers to the sum of the weight of each molecule in the polymer and, therefore, carries no dimensional designation, and equivalent weight is calculated as the molecular weight divided by the functionality of the polymer. A particularly suitable resin is 331 Epoxy Resin made by Dow Chemical Company (Midland, Mich.; product code 19248). The 331 Epoxy Resin is formed from the reaction of epichlorohydrin and bisphenol A, has a preferred equivalent weight of 190, a functionality of 2.0, and a molecular weight of 380. The amount of resin in the base component may be increased to produce a gloss finish in the coating. For a flat finish, less resin is present in the base and a flatting agent, such as magnesium silicate, diatomaceous silica or fumed silica, is added.

The base component also includes a glycidyl ether diluent which facilitates thinning of the material and facilitates curing. The glycidyl ether diluent has an equivalent weight of from about 50 to about 350. A particularly suitable diluent is Epodil 732 made by Pacific Anchor Chemical (Los Angeles, Calif.) which has a molecular weight of about 165. A coalescing agent and defoamer are also part of the base component and serve to coalesce the water and solvent phase of the coating. A particularly suitable coalescing agent is a nonylphenol ethoxylated-type agent, such as Igepal Co-897 made by Rhone-Poulenc (Louisville, Ky.). A particularly suitable defoamer may be a mixture of silicone in paraffin-based mineral oil. Byk®-034 Defoamer made by BYK-Chemie USA (Wallingford, Conn.) is appropriate for use in the base component Byk®-034 has a density of about 0.84 to 0.88 g/cm$^3$ at 20° C. and a refractive index of 1472 to 1482.

The base component further includes either 2 butoxyethanol or ethylene glycol monobutyl ether as a water-miscible solvent Butyl Cellosolve® Solvent, having a molecular weight of 118.18, made by Union Carbide (Danbury, Conn.) may be particularly suitable for this purpose. An amount of water is also added. The water may be from the tap, de-ionized or distilled. A silicone additive, such as BYK®-370 (BYK Chemie Co.; equivalent weight of 48) may be added in the amount of about 1% to 5% of the total volume to render the coating more repellent and resistant to scratching.

A pigment or coloring agent may preferably be added to the base component since epoxy inherently produces a yellowish tint in the clear state. Any number of coloring agents may be added depending on the desired color. Examples of pigments include titanium dioxide, red iron oxide, black iron, yellow iron oxide, and the like. However, the water-based epoxy may be used in the clear state if desired.

The reactant component of the water-based epoxy protective coating includes a polyamide resin having an equivalent weight of about 50 to about 600, isopropanol (about 50% to about 99% by concentration), and water. The polyamide resin serves as a curing agent in the formation of the coating. Particularly suitable polyamide resins for use in the reactant component are Casamid 360W and Casamid 362W, both made by Pacific Anchor Chemical Corp. (Los Angeles, Calif.). Casamid 360W has a preferred equivalent weight of 160 and a specific gravity of 1.05 at 68° F. (20° C.).

Aliphatic Urethane

The protective coating of the present invention may also be an aliphatic urethane having a low volatile organics content (VOC) formed from two separate components, a base component which includes a polymer having reactive sites capable of reacting with isocyanates and a reactant component, which provide initiation of cross-linking of the polymeric components upon mixing. The aliphatic urethane coating is primarily characterized by the impenetrable surface it provides due to the high density of cross-linkages in the polymer as compared to other types of cross-linked polymeric coatings. The aliphatic urethane coating is thus resistant to penetration of any substances such as solvents or foods, is stain-resistant and weather-resistant, and is not compromised or affected by application of any cleaner. In particular, the aliphatic urethane coating is formulated to withstand application of high concentrations (50% to 100% by weight) of N-methyl pyrrolidone without effecting the integrity of the cross-linkages in the coating.

The base component of the aliphatic urethane coating includes a polymer or monomer having a hydroxyl or amine content (i.e., the percent of the OH or NH weight relative to the weight of the molecule) in the range of 1.0% to 94.0%. Suitable materials include acrylic polyols, polyether polyols, and ethylene or propylene glycols. Particularly suitable is a saturated polyester polyol having an equivalent weight of from about 150 to about 1300. An exemplar suitable material is Desmophen 650A-65PMA (Mobay Corp., Pittsburgh, Pa.) which has a preferred equivalent weight of about 325 (between 320 and 330), a functionality of 12 and a molecular weight of about 3900 (between 3500 and 4300).

The base component also includes a solvent or mixture of solvents, and suitable solvents include methyl ethyl ketone, n-butyl acetate, xylene, glycol ethers and acetates thereof, such as propylene glycol monomethyl ether acetate (PM Acetate), toluene, methyl isobutyl ketone, methyl amyl ketone, ethyl acetate and 1-1-1 trichloroethane (used in low VOC formulations). A metal-containing accelerator, or catalyst, selected for reactivity of cyano (NCO) and hydroxyl (OH) groups or cyano (NCO) and amine (NH$_2$) groups may be added to the base component. Such catalysts include tributyltinoxide, dibutyltin dilaurate and metal carboxylates.

Flow agents may be added to the base component to improve handling of the substance. Examples of such flow agents include a combination of an ethyl acrylate and 2-ethyl hexyl acrylate (Modaflow®), polysiloxanes, acrylics and polyacrylics, acrylates and polyacrylates and silicones. A surface additive, such as hydroxy polydimethylsiloxane, hydroxy polydialkylsiloxane or similar siloxane or silicone compounds, may be added to enhance the abrasion-resistant characteristic of the coating. A particularly suitable silicone additive is BYK®-370 (BYK Chemie, Wallingford, Conn.).

The aliphatic urethane coating may be formulated in gloss, semi-gloss or flat finishes, and may be clear or pigmented. In a flat finish formulation, silicate flatting agents, such as magnesium silicate (talc), diatomaceous silica or fumed silica, may be used to produce a flat finish. Also, anti-settling agents may be added, such as a bentonite, polyamide, polyolefin, or polyether esters. The coating may be pigmented with any pigment, colorant or dye commonly used in the industry.

The reactant component of the aliphatic urethane coating includes an aliphatic polyisocyanate having a isocyanate (NCO) content (i.e., percentage of the weight of the cyano group relative to the weight of the molecule) ranging from about 3.0% to about 50.0%, a molecular weight of from about 100 to about 5,000 or greater, and an equivalent weight of from about 100 to about 500. A preferred molecular weight may be about 850. Exemplar materials include hexamethylene diisocyanate, and isophorone diisocyanate.

A particularly suitable material is Desmodur N-75 (Mobay Corp, Pittsburgh, Pa.) which has a preferred equivalent weight of 255, a functionality of 3.3 to 3.5, a molecular weight of between 841.5 and 892 and an NCO content of about 16.5%. Desmodur N-75, for example, is pre-formulated with butyl acetate and xylene, but these or other solvents may be added to a diisocyanate material as needed. A water-binding agent, such as an alkyl ortho formate, may need to be added to the reactant component to absorb water, particularly when the reactant component has been sitting for some time.

When the base component and reactant component are added together, as described further hereafter, and are in a liquid state, a typical clear coating, in either a flat, gloss or semi-gloss finish, will contain from between about 29% to about 33% by weight of curable polymer (such as a polyester polyol), between about 23% to about 27% by weight of reactant (such as a diisocyanate), between about 37% to about 45% by weight of solvent or combined solvents (such as MEK, xylene and the like) and between about 0% to about 4.5% by weight of other materials, such as flatting agents, silicates, flow agents or an accelerator. In a white coating, to which a pigment may be added, the typical composition will contain about 27% by weight of curable polymer, about 18% by weight of reactant, about 33% by weight of solvent or mixed solvents, about 2% by weight of other materials (flatting agents, flow agents, etc.), and about 25% by weight of titanium dioxide.

Prior to application to a surface of either the water-based epoxy coating or the aliphatic urethane coating, the surface must be prepared. The surface may be previously painted. The surface to be coated should be free from wax, grease, oil or like materials. If the water-based epoxy is to be applied, the surface need not be free of moisture since moisture, if not free standing, is not detrimental to application or performance of the coating. However, if the aliphatic urethane is to be applied, the surface should be dry. When applying either coating, any glossy, glazed or dense surfaces must be dulled prior to application.

Any patching or seaming of surfaces should be completed before application. Concrete block or similar rough surfaces may be filled with an acrylic block filler. Metals should be primed with a rust inhibiting primer. The primer should be allowed to dry at least six hours before applying the protective coating of the present inventions Thirty minutes before application, equal amounts of the base component and the reactant component of the water-based epoxy coating are mixed together by stirring. A lifting motion should be used to assure complete mixing. The pot life of the admixture is at least four hours and, if desired, the mixture can be refrigerated to extend pot life. The dual-component mixture may be applied to the target surface by any conventional means, such as brushing or spraying. The surface temperature should be from about 50° F. (10° C.) to a maximum of 95° F. (35° C.). Application should be done when the ambient temperature is above 50° F. (10° C.) and not greater than about 85° F. (30° C.).

A gallon (3.785 liters) of water-based epoxy coating will cover about 150 to about 200 square feet (about 14 square meters to about 19 square meters). The resulting coverage may be about 2.0 mil to about 4.0 mil (0.051 mm to 0.10 mm) depending on surface porosity and application method and number of applications. The coating is tack-free in about an hour, and a recoat may be reapplied after six hours. The coating is completely cured at between 24 to 48 hours. Contrary to prior art solvent-based epoxy systems, the water-based epoxy coating of the present invention will not lift prior alkyd or latex finishes having a gloss or sheen. In most cases, a single coating of the water-based epoxy coating is sufficient to protect the underlying surface from damage and will provide a coating which is easily cleaned after application of graffiti or other material.

Equipment used in applying the water-based epoxy system, and the surrounding area, may be easily cleaned with soap and water. If equipment is used for long periods of time or is allowed to sit unused for an extended period of time, a washing solvent may be required to clean the equipment.

Because application of the aliphatic urethane coating may slightly darken the color of the underlying surface (typically producing the look of a damp surface) it may be desirable to first coat the surface with a barrier/sealant formulated to prevent color change of the underlying surface and to prevent "bleeding" of other coatings into the aliphatic urethane coating. A particular useful barrier is a water-based coating comprising an acrylic copolymer, siloxane, dimethyl carbinol, water, flow additives and coalescing agents. One or two coats may be applied to a prepared surface, as required or desired. A thin coat, not exceeding 2 mil (0.051 mm), is recommended.

At any time prior to application, a one to four ratio of base component and reactant component of the aliphatic urethane coating may be mixed together using an upward motion to assure complete mixing. The mixture has a pot life of at least four hours and may be refrigerated to extend pot life. As with the water-based epoxy coating, one gallon will cover about 150 to about 200 square feet (about 14 square meters to about 19 square meters) with a resulting coating thickness of from about 2.0 to about 4.0 mil (0.051 mm to about 0.10 mm), depending on the surface porosity and texture, and the method of application. Application should be done on surfaces having a temperature of less than 95° F. (35° C.), and should be done when the ambient temperature is between about 50° F. (10° C.) and 85° F. (30° C.). The coating is tack-free after one hour, and a subsequent coat may be applied after six hours. The coating is substantially cured at about 24 to 48 hours and fully cured at 7 days.

Equipment must be cleaned promptly after application of the aliphatic urethane coating. The equipment may be cleaned with either xylene, lacquer thinner or n-butyl acetate. If the equipment has been allowed to sit for a long period of time and the coating has begun to harden on the equipment, the cleaner described hereinafter might be effective to clean the equipment.

The aliphatic urethane coating of the present invention is particularly suited for graffiti control because it provides a hardened (85 D Shore) surface which is abrasion-resistant, chemical-resistant and high-temperature resistant (93.3° C.). The coating is permeable to air making it suitable for architectural use. The coating is also weather-resistant as shown in TABLE I, below.

The relative high density of the cross-linking of the aliphatic urethane coating renders it significantly more resistant to degradation from application of solvents and other strong chemicals than other coatings, as shown in TABLE II, below.

The aliphatic urethane coating of the present invention was compared with other coatings currently marketed and used as anti-graffiti coatings in application of 100% concentration N-methyl pyrrolidone with the results shown in TABLE III. The four coatings a) the aliphatic polyester urethane of the present invention (APU), b) ProSoCo Graffiti Control A&B of ProSoCo, Inc., Kansas City, Kans. (ProSoCo), c) Tex-Cote® Graffiti Gard IIIS of Textured Coatings of America, Inc, Los Angeles, Calif. (Tex-Cote®), and d) Monochem Perma Shield®—Graffiti Resistant Coating of Monopole, International, Inc., Glendale Calif. (Perma Shield®), were prepared in accordance with the ASTH D-609 protocol and were allowed to cure per the manufacturer's specifications. The samples were then immersed in 100% N-methyl pyrrolidone per ASTH F-483, procedure 8–9.0, protocol. The samples were checked at five minute intervals for softening, lifting, blistering and discoloration. It can be seen that the APU coating is capable of withstanding prolonged exposure to high concentrations of N-methyl pyrrolidone while other graffiti coatings are not.

CLEANER

The graffiti-removal system of the present invention is specifically designed to employ a cleaner which is formulated to remove graffiti and other unwanted materials from the surface of the disclosed protective coatings without compromising or harming the protective coatings. The cleaner is selected to be non-toxic, biodegradable and safe for use in or near water sources, The cleaner of the present invention includes N-methyl pyrrolidone (NMP) in an amount greater than fifty percent by weight. A high concentration of N-methyl pyrrolidone is most conducive to cleaning of contaminants from surfaces but is destructive to solvent-evaporated coatings or polymeric coatings having low density cross-linking (see immersion tests of TABLE III). Therefore, the present coatings are formulated to withstand NMP in concentrations greater than 95% by weight.

The cleaner also includes a surfactant which acts with the N-methyl pyrrolidone to provide complete cleaning of the surface and may contain an oil-based fragrance. The surfactant may be either anionic or nonionic, and may be in either a powder or liquid forms. A particularly suitable surfactant is Plurafac D-25, an anionic surfactant made by BASF (Parsippany, N.J.) which acts in the manner of a chelating agent.

The cleaner is effective for removing unwanted materials from surfaces having a protective coating. The cleaner may be applied to a graffitied surface by any number of means, including spraying or brushing it on, applying with a cloth, or the like. The cleaner should be slightly agitated or rubbed onto the graffitied surface with a brush or cloth. Water is then applied against the surface at a pressure of between 40 to 120 psi. Water applied from a squirt bottle will often suffice. The water should be directed downwardly to allow the graffiti and cleaner to flow downwardly off the surface.

The cleaner of the invention may be used on other surfaces other than those coated with the water-based epoxy or aliphatic urethane coatings disclosed herein. The cleaner is effective for removal of epoxy- and urethane-based spray paints of the kind typically used for graffiti, indelible inks, industrial chemicals, food stains, solvents, and other substances.

EXAMPLE AND TABLES

The base component of the water-based epoxy may be formed by the following method:

Example A

In a large container, twenty-five percent by weight of 331 Epoxy Resin (Dow Chemical), three percent by weight of Epodil 732 (Glycidyl ether diluent), one percent by weight of Igepal Co-897 (coalescing agent), one percent by weight of BYK®-034 (defoamer), five percent by weight of 2-butoxyethanol and thirty-one percent by weight of water were mixed together with a stirring action. To the mixture was added thirty-four percent by weight of titanium dioxide pigment, and the mixture was stirred again for ten minutes. All mixing took place at room temperature. The weight of the combined ingredients was measured at 11.715 pounds per gallon (1.39 kg/l).

The reactant component of the water-based epoxy coating may be formed by the following method:

Example B

In a large container, fifty-eight percent by weight of Casamid 360 W polyamide resin, fifteen percent by weight of isopropyl alcohol (99% by concentration) and twenty-seven percent by weight of tap water were added together and stirred at room temperature for approximately ten minutes until blended. The resulting mixture was measured at 8.24 pounds per gallon (0.98 kg/l).

The base component of the aliphatic urethane coating may be formed by the following method:

Example C

In a large containers about fifty percent by weight of Desmophen 650A-65 PMA was added to about seven percent by weight of methyl isobutyl ketone. To that was added about fifteen percent by weight of xylene (Ashland Chemical, Columbus, Ohio), about twenty-seven percent by weight of n-butyl acetate (urethane grade) and about one percent by weight of BYK 370, a hydroxy polydimethylsiloxane (BYK-Chemie USA, Wallingford, Conn.). A mixture of about 0.2 percent by weight of combined ethyl acrylate and 2-ethylhexl acrylate copolymer (Modaflow®, Monsanto, St. Louis, Mo.) was added as a flow agent. The entire mixture was stirred for about ten minutes at room temperature. The resulting mixture was measured at 8.273 pounds per gallon (0.98 kg/l).

The reactant component of the aliphatic urethane coating may be formed by the following method:

Example D

In a large container, about sixty-nine percent by weight of Desmodur N-75, a polymeric hexamethylene diisocyanate, was added to about fifteen percent by weight of xylene, about fifteen percent by weight n-butyl acetate, and about one percent by weight of alkyl ortho formate. The mixture was stirred about ten minutes at room temperature. The resulting mixture was measured to be 8.227 pounds per gallon (0.98 kg/l).

A method of forming the cleaner is set forth as follows:

Example E

To approximately ninety-eight percent by weight of N-methyl pyrrolidone was added about two percent by weight Plurafac D-25 surfactant, and the mixture was stirred at room temperature. The mixture may be stored at room temperature in air-tight containers indefinitely.

The cleaner may also be formulated as a paste by the addition of a thickening agent, as follows:

Example F

To approximately 95% by weight of N-methyl pyrrolidone was added about 5% by weight Aerosil®200 (Degussa Corp., Richfield Park, N.J.) [a fumed silica], 2% by weight of Plurafac D-25 [surfactant] and 1% by weight fragrance, and the mixture was combined into a paste.

TABLE I

| Test Method | Control | 1 Month | 2 Months | 3 Months |
|---|---|---|---|---|
| ALIPHATIC POLYESTER URETHANE--CLEAR COAT WEATHEROMETER TEST RESULTS | | | | |
| Specular Gloss (ASTM D-523) | 98 | 98 | 95 | 91 |
| Chalking (ASTM D-659) | | None | None | None |
| Cracking (ASTM D-661) | | None | None | None |
| Color Difference (ASTM D-2616) | Clear | None | None | None |
| ALIPHATIC POLYESTER URETHANE--COLOR COAT WEATHEROMETER TEST RESULTS | | | | |
| Specular Gloss (ASTM D-523) | 61 | 58 | 50 | 45 |
| Chalking (ASTM D-659) | | None | None | None |
| Cracking (ASTM D-661) | | None | None | None |
| Color Difference (ASTM D-2616) | White | None | None | None |

The aliphatic polyester urethane coatings tested in TABLE I were prepared according to ASTH D-609 protocol and were allowed to cure for 5 days. A portion of each coating was set aside in a dark container to serve as a control sample and the remaining samples were attached to the rotating test fixture of a standard weatherometer. The samples were continuously exposed to U.V. radiation. Each indicated test was performed in accordance with the ASTM protocol noted. All ASTM protocols referred to herein are 1990 protocols.

TABLE II

| ALIPHATIC POLYESTER URETHANE (APU) CHEMICAL SPOT TEST COMPARATIVE DATA | | | |
|---|---|---|---|
| SPOTTING MATERIALS | SILANE | APU COATING | EPOXY |
| MEK | 10 min. B | NE | NE |
| Carboxylic Acid | 20 min. SF | NE | NE |
| 75% Phosphoric Ac. | 6 min. SF | NE | NE |
| 37% HCL | 15 min. B | NE | 19 Hr. D |
| 50% Sulfuric Acid | 3 Hr. B | NE | NE |
| 20% Nitric Acid | 19 Hr. B | 68 Hr. B | 35 Hr. D |

Legend:
NE = No Effect After 5 days
SF = Softened Film
LF = Lifted Film
B = Blistered
D = Discolored
(Each coating was applied at 2 mil (0.051 mm) thickness to a flat surface.)

TABLE III

| N-METHYL PYRROLIDONE IMMERSION TESTING DATA | | | | |
|---|---|---|---|---|
| | APU | PROSOCO | TEXCOTE ® | PERMA SHIELD ® |
| Softening | NE | Immed. | Immed. | 15 min. |
| Lifting | NE | 5 min. | 5 min. | 15 min. |
| Blistering | NE | 5 min. | 5 min. | 15 min. |
| Discoloration | None | None | None | None |

(NE = No Effect After 7 days)

The present invention may be used in many applications in addition to that of removal of graffiti as described hereinabove. The present invention may be employed successfully, for example, in applying a protective coating to walls in hospitals, industrial chemical treatment plants, food preparation areas, and the like. Chemical solvents, cleaners, and other defacing materials such as food, will not harm the protective coating surface, and are easily removed with the cleaner means described. Reference herein to specific details of the graffiti-removal system is by way of example and not by way of limitation. It will be apparent to those skilled in the art that many modifications of the basic formulations and methods may be made without departing from the spirit and scope of the invention as recited by the claims.

What is claimed is:

1. A method for protecting a substrate with a two layer protective coating, the method comprising:
   priming a substrate with a water-based primer formed from a primer composition comprising an acrylic copolymer and water to yield a primed substrate with a polymerized primer layer;
   wherein the primer layer is at least substantially clear;
   forming a composition by mixing a polyol and an aliphatic polyisocyanate;
   wherein said polyol is selected from the group consisting of saturated polyester polyols having an equivalent weight ranging from about 150 to about 1300, acrylic polyols, polyether polyols, ethylene glycol and propylene glycol; and
   applying the composition under ambient conditions onto the primer layer and allowing the composition to form a saturated, aliphatic urethane protective topcoat under ambient conditions;
   wherein said topcoat is at least substantially clear;
   wherein said primer layer prevents the topcoat from causing the substrate to appear substantially darkened after the topcoat has hardened on the primer layer compared to the appearance of the substrate before application of the two layer protective coating;
   whereby the substrate is protected by the ability of the topcoat to substantially resist penetration by unwanted substances and whereby unwanted substances applied onto the topcoat can be removed with a solvent without substantially degrading the topcoat.

2. A method for protecting a substrate with a protective coating as defined in claim 1, further comprising the step of applying a cleaner to remove any unwanted substances from the topcoat after unwanted substances are applied onto the topcoat, the cleaner being applied without substantially degrading the topcoat.

3. A method for protecting a substrate with a protective coating as defined in claim 1, wherein said saturated polyester polyols have a weight average molecular weight ranging from about 3500 to about 4300.

4. A method for protecting a substrate with a protective coating as defined in claim 1, wherein the composition is formed by mixing a flatting agent with the polyol and the aliphatic polyisocyanate; and
   wherein the urethane protective topcoat has a finish that is at least primarily flat.

5. A method for protecting a substrate with a protective coating as defined in claim 4, wherein the flatting agent is selected from the group consisting of talc, diatomaceous silica and fumed silica.

6. A method for protecting a substrate with a protective coating as defined in claim 4, wherein the flatting agent is included in the composition in an amount ranging up to about 4.5% by weight of the composition.

7. A method for protecting a substrate with a protective coating as defined in claim 1, wherein said aliphatic polyisocyanate has a molecular weight ranging from about 100 to about 5000 and an equivalent weight ranging from about 100 to about 500.

8. A method for protecting a substrate with a protective coating as defined in claim 2, wherein said cleaner comprises N-methyl pyrrolidone.

9. A method for protecting a substrate with a protective coating as defined in claim 2, wherein said cleaner comprises N-methyl pyrrolidone in a concentration in a range from about fifty percent to one hundred percent by weight of the cleaner.

10. A method for protecting a substrate with a protective coating as defined in claim 2, wherein said cleaner is selected from the group consisting of acetone and xylene.

11. A method for protecting a substrate with a protective coating as defined in claim 2, further comprising rinsing the cleaner and any unwanted substances off of the topcoat.

12. A method for protecting a substrate with a two layer protective coating, the method comprising:
    priming a substrate with a water-based primer formed from a primer composition under ambient conditions comprising an acrylic copolymer and water to yield a primed substrate with a polymerized primer layer;
    wherein the primer layer is at least substantially clear;
    forming a composition by mixing a flatting agent, a saturated polyester polyol having a weight average molecular weight ranging from about 3500 to about 4300 and an aliphatic polyisocyanate;
    applying the composition onto the primer layer and allowing the composition to form a saturated, aliphatic urethane protective topcoat under ambient conditions;
    wherein said topcoat is at least substantially clear;
    wherein said topcoat has a finish that is at least primarily flat;
    wherein said primer layer prevents the topcoat from causing the substrate to appear substantially darkened after the topcoat has hardened on the primer layer compared to the appearance of the substrate before application of the two layer protective coating;
    whereby the substrate is protected by the ability of the topcoat to substantially resist penetration by unwanted substances and whereby unwanted substances applied onto the topcoat can be removed with a solvent without substantially degrading the topcoat.

13. A method for protecting a substrate with a protective coating as defined in claim 12, wherein the primer composition further comprises siloxane and dimethyl carbinol.

14. A method for protecting a substrate with a protective coating as defined in claim 12, wherein the flatting agent is selected from the group consisting of talc, diatomaceous silica and fumed silica.

15. A method for protecting a substrate with a protective coating as defined in claim 12, wherein the flatting agent is included in the composition in an amount ranging up to about 4.5% by weight of the composition.

16. A method for protecting a substrate with a protective coating as defined in claim 12, further comprising the step of applying a cleaner to remove any unwanted substances from the topcoat after unwanted substances are applied onto the topcoat, the cleaner being applied without substantially degrading the topcoat.

17. A method for protecting a substrate with a protective coating as defined in claim 16, wherein said cleaner comprises N-methyl pyrrolidone.

18. A method for protecting a substrate with a protective coating as defined in claim 16, wherein said cleaner is selected from the group consisting of acetone and xylene.

19. A method for protecting a substrate with a protective coating as defined in claim 16, further comprising rinsing the cleaner and any unwanted substances off of the topcoat.

\* \* \* \* \*